Aug. 16, 1932.  E. B. VAN NORDEN  1,872,613
MARKING TAG
Filed April 17, 1930
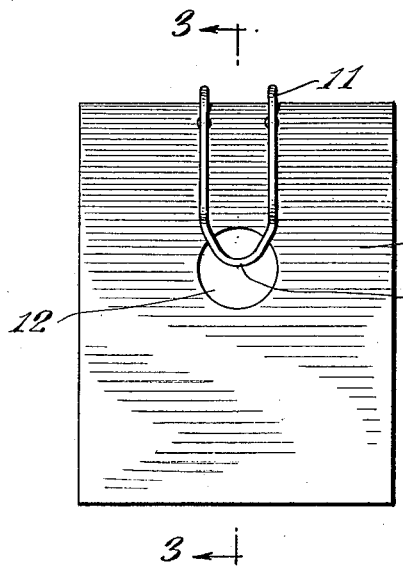
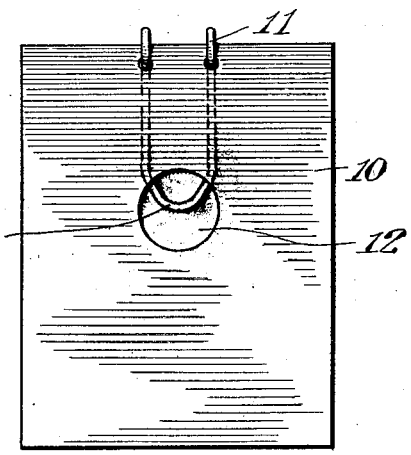
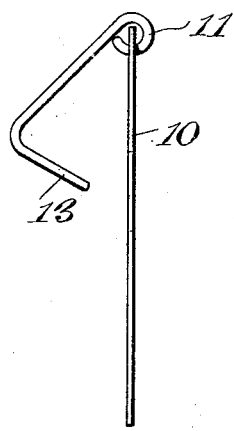
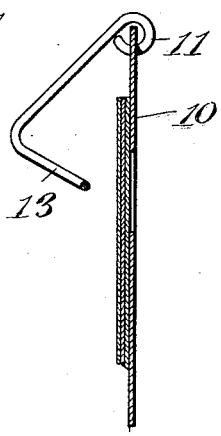
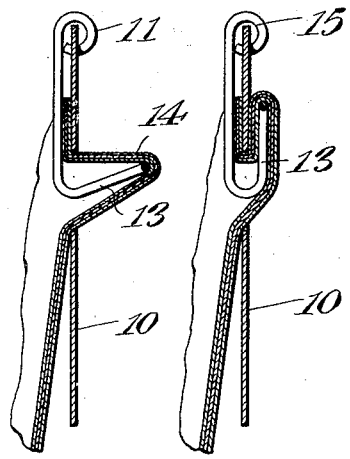
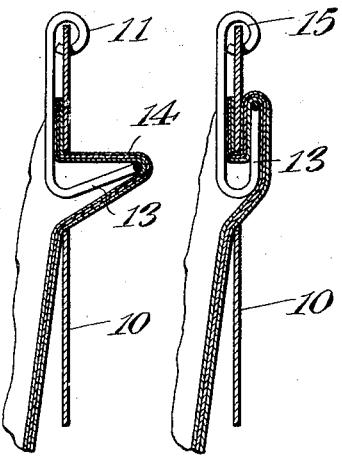
INVENTOR
E. B. Van Norden
BY
Emery, Booth, Varney & Whittemore
ATTORNEYS Patented Aug. 16, 1932

1,872,613

UNITED STATES PATENT OFFICE

ERICCSON B. VAN NORDEN, OF JACKSON HEIGHTS, NEW YORK, ASSIGNOR TO A. KIMBALL COMPANY, OF NEW YORK, N. Y., A CORPORATION OF NEW YORK

MARKING TAG

Application filed April 17, 1930. Serial No. 444,903.

This invention relates to marking tags, particularly to means for attaching tags to merchandise, and has for an object the provision of means furnishing quick and secure attachment of tags without injury to the merchandise.

A form of tag now in wide use carries a pointed staple which penetrates the material and is turned on the other side to secure the tag to the material. The prongs of the staple may injure the material, especially silk or other fine material. According to the present invention the material is not penetrated or otherwise injured in the attachment of the tag and moreover the detachment of the tag is rendered easier and less likely to injure the material.

Other objects and advantages of the invention will appear hereinafter.

A preferred embodiment of the invention selected for purposes of illustration is shown in the accompanying drawing, in which:

Fig. 1 is a back plan view of the tag;

Fig. 2 is a face plan view;

Fig. 3 is a side view with the tag ready for attachment;

Figure 4 is a section with the tag placed on the material;

Figure 5 is a similar section at an intermediate stage of attachment; and

Figure 6 is a similar section with the tag fully attached.

In the specific embodiment of the invention chosen for purposes of illustration the tag 10 is provided with an attaching member 11 secured to the upper edge of the tag. The tag illustrated is of a single sheet in which the material is attached to one side of the sheet but it is to be understood that the invention may be applied as well to a tag in which two sheets are used with the material secured between the sheets.

The tag is provided with an aperture 12 and the lower end of the attaching member 11 is formed with a lateral extension 13 adapted to enter the aperture. This extension 13 as shown in Figures 1 and 2 is in the shape of a loop which does not have any sharp points or barbs to catch threads of the material but which presents a broad surface of contact to the material. The method of securing the tag to the material is shown in Figures 4 to 6. Here both thicknesses of the top of one silk stocking and one thickness of the other one of the pair are caught in a loop 14 upon the smooth end of the loop extension 13 and pushed through the aperture 12. After the material has been pushed through the aperture as seen in Fig. 5 the lateral extension 13 is bent upwardly into the position shown in Fig. 6 to clamp the tag and the material together.

To remove the tag from the material it is only necessary to bend the lateral extension 13 outwardly from the position of Fig. 6 when the material may be pulled out. In this connection it will be noted that since one or more thicknesses of material lie behind the extension 13 it will be easy for a person to grasp the extension and bend it out without tearing the material. On the other hand when staple prongs are used they embed themselves into the material and it is sometimes necessary to insert a sharp edge beneath them in order to raise them and this is likely to cut or tear the material.

The attaching member 11 is shown in the drawing as having a circular eye 15 connected with the top edge of the tag but the attachment may be made in other ways. For example, if the tag has sufficient flexibility to permit the separation of the tag and the lower end of the attaching member to the extent shown in Fig. 3, the attaching member may be secured to the tag without hinging.

It will be understood that the invention may be variously modified and embodied within the scope of the subjoining claims.

What I claim is:

1. A marking tag having an aperture near one end thereof, a metal loop hinged to the top edge of said tag and lying on one side of said tag, said loop being provided with a lateral extension including the rounded end of the loop for forcing a fold of material through said aperture, said lateral extension being bent upward on the other side of the tag to secure the tag and material together.

2. A marking tag having an aperture therein and a member for forcing a fold of material through the aperture, said member being pushed through the aperture with a fold of material upon the end thereof and bent down with the fold of material upon the other side of the tag to secure the tag and material together.

3. A marking tag comprising a card having an aperture therein, and a member hinged to an edge of the tag and provided with a lateral extension with a blunt end adapted to force a fold of fabric through said aperture.

4. In a marking tag in combination, a card provided with an aperture, a bendable member secured to said card adjacent the aperture, said member being provided with a laterally bent portion directed toward the aperture and having a nonpiercing blunt end adapted to push a fold of pliable material through said aperture, the bend being made at a point where it will fall at the aperture when the end portion is pushed therethrough, the bent portion being of considerable length and being bent down upon the opposite side of the card from that on which the body portion of the member is disposed, when placed in final attaching disposition.

In testimony whereof, I have signed my name to this specification this 15th day of April 1930.

ERICCSON B. VAN NORDEN.